3,397,180
PROCESS FOR PREPARING 1-FLUOROVINYL METHYL KETONE AND COPOLYMERS OF THE SAME
John Andrew Sedlak and Ken Matsuda, Stamford, Conn., assignors to American Cyanamid Company, Stamford, Conn., a corporation of Maine
No Drawing. Filed Aug. 31, 1964, Ser. No. 393,354
3 Claims. (Cl. 260—63)

ABSTRACT OF THE DISCLOSURE

This invention relates to 1-fluorovinyl methyl ketone and polymers produced therefrom. Still more particularly, this invention relates to 1-fluorovinyl methyl ketone, a method for the production thereof and polymers produced therefrom.

---

The existence of 1-chlorovinyl methyl ketone and 1-bromovinyl methyl ketone is acknowledged in the art, see Lohringer et al., C.A., vol. 53, page 19882, 1959 and Kosower et al., J. Org. Chem., vol. 28, page 663, 1963. Each of these monomers, however, is very unstable and polymerizes spontaneously upon production to dark, unattractively colored polymers. The polymerization is accompanied by conjugation due to hydrogen halide evolution, which evolution is believed to cause the formation of the undesirable color in the polymer, either during or after production.

We have now discovered that 1-fluorovinyl methyl ketone can be polymerized to polymers which do not become colored during polymerization of the monomer or upon standing. The polymers of our invention remain colorless for long periods of time even at temperatures significantly higher than ambient.

It is therefore an object of the present invention to provide 1-fluorovinyl methyl ketone.

It is a further object of the present invention to provide 1-fluorovinyl methyl ketone and polymers thereof.

It is a further object of the present invention to provide 1-fluorovinyl methyl ketone, a process for the production thereof and stable polymers produced therefrom.

These and other objects of the present invention will become more apparent to one skilled in the art upon reading the more detailed description set forth hereinbelow.

1-FLUOROVINYL METHYL KETONE

1-Fluorovinyl methyl ketone has the structural formula (I) 

It is colorless, volatile liquid having a boiling point of 71° C. and polymerizes readily to homo- and copolymers. It is most useful as an intermediate for the production of such polymers.

THE POLYMERS

As previously mentioned, 1-fluorovinyl methyl ketone can be homopolymerized and copolymerized into useful polymers, which have high glass transition temperatures and are unexpectedly very stable. They are substantially colorless and remain so for substantial lengths of time even at elevated temperatures.

1-fluorovinyl methyl ketone can readily be polymerized in bulk without benefit of a catalyst by the application of heat or by the application of heat and pressure, or may be produced with the aid of a catalyst, in solution or emulsion. It is desirable and preferable, however, to incorporate into the polymerization media, a catalyst such as the various free-radical generating polymerization catalysts known in the art and more specifically discussed hereinbelow.

The molecular weights of the homopolymers of our invention are quite high, i.e., in excess of 50,000, as calculated by the intrinsic viscosities of the polymers measured in chloroform solution at 30° C. and further discussed in Principles of Polymer Chemistry, P. J. Flory, Cornell University Press, 1953. The homopolymers prepared in bulk are higher in molecular weight than those produced using a catalyst solution and are therefore less readily dissolved in chloroform. The complete solubility of these polymers in various organic solvents indicates that they are not cross-linked. The polymers prepared in solution, are suitable for casting films, which after drying, are clear, hard, and flexible. The polymers prepared by the use of emulsion systems are not completely soluble in chloroform, indicating that, as expected, they are of much higher molecular weight than the polymers prepared in solution.

1-fluorovinyl methyl ketone can be homopolymerized, as indicated above, or copolymerized with other compounds containing a polymerizable $CH_2=C<$ group. That is to say, the 1-fluorovinyl methyl ketone may be homopolymerized or copolymerized by contacting with various free-radical generating catalysts such as the inorganic peroxides, e.g., hydrogen peroxide, barium peroxide, magnesium peroxide, etc., and the various organic peroxy catalysts, illustrative examples of which are: the dialkyl peroxides, e.g., diethyl peroxide, dipropyl peroxide, dilauryl peroxide, dioleyl peroxide distearyl peroxide, di-(tertiary-butyl) peroxide, and di-(tertiary-amyl) peroxide, such peroxides often being designated as ethyl, propyl, lauryl, oleyl, stearyl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-acids, e.g., ammonium persulfate, sodium persulfate, potassium persulfate, sodium perborate, potassium perborate, sodium perphosphate, potassium perphosphate, etc. Other examples of organic peroxide catalysts that may be employed include the following: tetralin hydroperoxide, tertiary-butyl diperphthalate, cumene hydroperoxide, tertiary-butyl perbenzoate, 2,4-dichlorobenzoyl peroxide, urea peroxide, caprylyl peroxide, p-chlorobenzoyl peroxide, 2,2-bis(tertiary-butyl peroxy)butane, hydroxyheptyl peroxide and diperoxide of benzaldehyde. Other so-called "free-radical" types of catalysts, e.g., $\alpha,\alpha'$-azodiisobutyronitrile, also may be used to accelerate polymerization.

The amount of catalyst used may be varied widely depending upon the particular catalyst utilized and the other polymerization conditions, and generally may range from about 0.01% to about 5.0% by weight, based on the weight of the 1-fluorovinyl methyl ketone. Preferably, the amount of catalyst is within the range of from about 0.1% to about 3.0%, by weight, of the monomer being polymerized. An inert atmosphere is preferably used, such as nitrogen, argon, neon, normally gaseous hydrocarbons such as propane, pentane, hexane and the like.

The polymerization reactions may be carried out within a temperature range of from about 0° C. to about 100° C., preferably within the range of from about 20° C. to 80° C., and at atmospheric pressure. Superatmospheric and/or subatmospheric pressures may also be used as dictated by the specific apparatus, conditions, comonomers or other variables involved.

Residence time of the reactants in the reaction zone generally should also be controlled for optimum results. We have found that the residence time may vary from as little as 30 minutes to as much as 24 hours. However, it is preferred that the residence time be within the order of from about 1 hour to about 12 hours. Obviously, it is preferred that the residence time in the reaction zone be held to a minimum in view of economic considerations.

The polymeric materials produced are water-insoluble and are usually recovered in excellent yields from the reaction media by precipitation with a known non-solvent therefor such as methanol and the like.

When the monomer or monomers are polymerized in solution, such solvents as benzene, chloroform toluene, xylene, carbon tetrachloride, hexane, heptane and the like may be used in amounts at least sufficient to solubilize the monomers involved.

When an emulsion polymerization process is utilized, such non-ionic emulsifiers as ethylene oxide condensates, condensation products of propylene oxide and propylene glycol, stearamide and the like in amounts ranging from about 0.5% to about 20%, by weight, preferably 1% to 10%, by weight based on the weight of monomers, may be used.

When preparing copolymers of the 1-fluorovinyl methyl ketone of the present invention with other copolymerizable monomers it is generally preferable to use a weight ratio of from about 5% to about 75% of the novel 1-fluorovinyl methyl ketone of the present invention with correspondingly from about 95% to about 25% of the unsaturated monomers copolymerizable therewith. The same procedures mentioned above with regard to the homopolymerization of 1-fluorovinyl methyl ketone, may, as indicated, be used to form the copolymers.

Examples of monomers which can be copolymerized with the 1-fluorovinyl methyl ketone of the present invention, and which can be copolymerized either singly or in a plurality (two, three, four or any desired number), the latter often being desirable in order to improve the compatibility and copolymerization characteristics of the mixture of monomers and to obtain new and valuable copolymers having the particular properties desired for the particular service application, are such monomers as the unsaturated alcohol esters, more particularly the allyl, methallyl, 1-chloroallyl, 2-chloroallyl, cinnamyl, vinyl, methvinyl, 1-phenylallyl, butenyl, etc., esters of saturated and unsaturated aiphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above, e.g., methyl methacrylate, ethyl acrylate, etc.; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes, such, for example, as the various di-, tri-, and tetra - chloro - styrenes, -bromostyrenes, fluorostyrenes, -methylstyrenes, -ethylstyrenes, cyanostyrenes, etc., vinyl naphthalene, vinylcyclohexane, vinyl furan, vinyl pyridine, vinyldibenzofuran, divinyl benzene, trivinyl benzene, allyl benzene, diallyl benzene, N-vinyl carbazole, the various allyl cyano styrenes, the various alpha-substituted styrenes and alpha-substituted ring-substituted styrenes, e.g., alphamethyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methylacrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; butadienes, e.g., 1,3-butadiene, 2-chlorobutadiene, etc.; unsaturated polyhydric alcohols (e.g., butenediol, etc.) esters of saturated and unsaturated, aliphatic and aromatic monobasic and polybasic acids.

Other examples of monomers that can be copolymerized with the 1-fluorovinyl methyl ketone of the present invention are the vinyl halides, more particularly, vinyl fluoride, vinyl cholride, vinyl bromide and vinyl iodide, and the various vinylidene compounds, including the vinylidene halides, e.g., vinylidene chloride, vinylidene bromide, vinylidene fluoride, and vinylidene iodide, other comonomers being added if needed in order to improve the compatibility and copolymerization characteristics of the mixed monomers.

More specific examples of allyl compounds that can be copolymerized with the 1-fluorovinyl methyl ketone of the present invention are allyl alcohol, methallyl alcohol, diallyl carbonate, allyl lactate, allyl alpha-hydroxyisobutyrate, allyl trichlorosilane, diallyl methylglutonate, diallyl tartronate, diallyl mesaconate, the diallyl ester of muconic acid, diallyl chlorophthalate, diallyl dichlorosilane, the diallyl ester of endomethylenetetrahydrophthalic anhydride, triallyl tricarballyate, triallyl, cyanurate, triallyl citrate, triallyl phosphate, tetrallyl silane, tetrallyl silicate, hexallyl disiloxane, etc. Other examples of allyl compounds that may be employed are given, for example, in U.S. Patent No. 2,510,503, issued June 6, 1950.

Among the comonomers which are preferred for use in carrying our invention into effect are, for example, compounds such as styrene, methyl methacrylate, and acrylonitrile, the various substituted acrylonitriles (e.g., methacrylonitrile, ethacrylonitrile, phenylacrylonitrile, etc.), the various N-substituted acrylamides and alkacrylamides, for instance, N-dialkyl acrylamides and methacrylamides, etc., N-dimethyl, -diethyl, -dipropyl, -dibutyl, etc., acrylamides, and methacrylamides. Other monomers copolymerizable with the instant novel monomers are given, for instance, in U.S. Patent No. 2,601,572, dated June 24, 1952, where examples are given both by classes and species.

The novel polymers of our invention may be reinforced, dyed, etc., as the need may be, by the incorporation of materials such as dyes, pigments, lubricants, antioxidants, plasticizers, fillers, stabilizers, and the like.

The polymers of the instant invention may be used for the production of films, fibers, foils, molding compounds, adhesives, castings or various resin modifiers which may be used to impart rigidity, toughness, etc., thereto and the like.

THE NOVEL PROCESS

The novel dehydration process for the production of the novel 1-fluorovinyl methyl ketone of the present invention comprises contacting 3-fluoro-4-hydroxy-2-butanone with a dehydration catalyst, preferably in the presence of a polymerization inhibitor, and immediately removing and contacting the product vapor with ammonia to inhibit polymerization of the distillate.

The 3-fluoro-4-hydroxy-2-butanone is a known compound and can be produced by reacting fluoroacetone with paraformaldehyde in the presence of 2M-methanolic sodium methoxide under conditions more particularly described by Bergmann et al., J. Chem. Soc. p. 3457, 1961.

The novel process of our invention may be conducted at a temperature ranging from about 60° C., to about 250° C., preferably at a temperature ranging from about 100° C. to about 200° C. and at atmospheric pressure. Subatmospheric or superatmospheric pressures may alternatively be employed, if necessary or desirable, without detracting from the efficacy of the process, except for the necessity of minor equipment variations.

Examples of dehydration catalysts which may be used in our novel process include phosphoric acid and boric anhydride. The concentration of the dehydration catalyst employed generally ranges from about 5% to about 100%, by weight, preferably about 10% to about 60%, by weight, based on the weight of the butanone employed. At a concentration of much less than 5%, the reaction proceeds very slowly, and, in terms of practicality, essentially no reaction occurs. At concentrations somewhat higher than about 95%–100%, no additional increase in the rate of reaction has been observed. It can therefore be seen that the above enumerated concentration range regarding the dehydration catalyst is governed more by practicality than by criticality.

The reaction is preferably conducted in the presence of a polymerization inhibitor in that failure to do so generally results in instantaneous polymerization of the monomer to a homopolymer in the reaction vessel. Obviously, such a result is not commercially attractive since isolation of the polymer from any intricate equipment employed is virtually impossible.

Examples of polymerization inhibitors which may be employed during the dehydration per se, although all known inhibitors are, in general, useful, include hydroquinone, benzaldehyde, ascorbic acid, isoascorbic acid, resorcinol, tannen, phenolic resins, sulfur compounds and the like. The amount of inhibitor used should generally be not more than 1%, by weight, based on the weight of the monomer involved, with a range of from about 0.01% to 0.1% by weight, same basis, being sufficient.

Our novel process is preferably carried out in equipment such that the 1-fluorovinyl methyl ketone can be recovered instantaneously upon production by distillation. That is to say, since 1-fluorovinyl methyl ketone boils at 71° C., it is easily recovered by distillation of the reaction media as the product is produced. It is critical, however, that ammonia gas be present during the distillation so as to prevent the formation of polymer in the distillation apparatus. We have found that ammonia is very effective, if not critical, for said purpose, in that other known inhibitors failed to stem the polymerization of the vinyl ketone product.

Although the product may be produced in the presence of trace amounts of air, it is preferred to conduct the reaction in an inert atmosphere in order to increase the amount of possible recoverable 1-fluorovinyl methyl ketone and to prevent the ammonia gas from coming into contact with the reaction media in the reaction vessel. Any known inert gaseous material may be used to produce inert conditions in the reaction vessel with such compounds as those mentioned hereinabove in regard to the polymerization, i.e., nitrogen, argon, neon, normally gaseous hydrocarbons such as butane, propane, and the like, being exemplary.

The time of contact of the 3-fluoro-4-hydroxy-2-butanone with the dehydration catalyst is not critical and the reaction is generally merely continued until the product vapor ceases to come off.

The following examples are set forth for purposes of illustration only and are not to be construed as limitations on the instant invention except as set forth in the appended claims. All parts and percentages are by weight unless otherwise specified.

Example 1.—Preparation of 1-fluorovinyl methyl ketone

A suitable reaction vessel is equipped with a sealed stirrer, a barostatic dropping funnel, and a distillation head leading to a take-off condenser. The distillation head is arranged with an inlet for the passage of ammonia gas through the length of the head and out through the condenser and receiver. The dropping funnel is equipped with an inlet for a stream of inert gas passing in over the reaction mixture and out through the distillation head. By regulating the velocities of the two gas streams, it is possible to keep ammonia in contact with th distillate while avoiding contact of ammonia with the bulk of the reaction mixture.

Into the reaction vessel is placed 8 parts of aqueous 85–87% phosphoric acid solution and into the dropping funnel is placed 25.5 parts of 3 - fluoro - 4-hydroxy-2-butanone, 0.1 part of hydroquinone is added to each of the phosphoric acid solution, the fluorohydroxybutanone, and the receiver. The apparatus is swept with nitrogen and while maintaining the flow of nitrogen, the ammonia stream is started. The 3-fluoro-4-hydroxy-2-butanone is added dropwise to the reaction mixture and stirred in an oil bath at 150–155° C. over a period of 55 minutes. Product is distilled as formed. After an additional 15 minutes, distillation ceases. The distillate consists of 4.4 parts of an aqueous phase and 13.2 parts of an organic phase. Vapor phase chromatographic analysis shows that the organic material is 95% 1-fluorovinyl methyl ketone, amounting to a yield of 12.5 parts or 58%, based on the amount of 3-fluoro-4-hydroxy-2-butanone charged.

The organic product is washed with aqueous sodium chloride to remove ammonia, dried, and distilled to give 1-fluorovinyl methyl ketone, B.P. 71.3°, a colorless liquid.

The infrared spectrum of the monomer shows absorption at 1715 cm.$^{-1}$ for carbonyl and 1650 cm.$^{-1}$ for fluorovinyl. The mass spectrum and nuclear magnetic resonance spectrum are consistent with the assigned structure.

Analysis for $C_4H_5O$; Theory: C, 54.54; H, 5.72; F, 21.57; Found: C, 54.19; H, 5.47; F, 21.37.

Example 2.—(Comparative)

Example 1 is again repeated in all respects except that the ammonia stream is eliminated. After only a part of the 3-fluoro-4-hydroxy-2-butanone has been added, the condenser becomes plugged with a white polymer due to polymerization of the distillate.

Examples 3 and 4.—(Comparative)

Example 1 is again repeated in all respects, two runs, one using nitric oxide and the other using ethylene oxide in place of the ammonia as polymerization inhibitors, being conducted. In both cases, large amounts of polymerization occurs in the condenser, indicating that these known gaseous polymerization inhibitors are not effective in the process of the present invention.

Example 5

Utilizing the procedure of Example 1, all conditions being equal, 3-fluoro-4-hydroxy-2-butanone is heated at 170–175° C. with powdered boric anhydride as the catalyst in place of phosphoric acid. After 1 hour of reaction, 1-fluorovinyl methyl ketone is recovered in a yield of 60%.

Example 6.—Polymerization of 1-fluorovinyl methyl ketone

Under a nitrogen atmosphere, a suitable reaction vessel is charged with 1.4 parts of freshly-distilled 1-fluorovinyl methyl ketone, 0.0014 part of azobisisobutyronitrile, and 7 parts of benzene. The mixture is purged with a stream of nitrogen and the vessel is sealed. The vessel is immersed in an oil bath at 65° C. for 17 hours, during which time a white polymer precipitates from the solution. The benzene is decanted and the polymer is dissolved in chloroform. The solution is poured into stirred methanol to form fibrous particles of pure white polymer. The polymer is dried, redissolved, reprecipitated and finally dried in the open and then under vacuum at 50° C. for 6 hours. 0.9 part of poly(1-fluorovinyl methyl ketone) is recovered as a colorless, glassy polymer.

The intrinsic viscosity of the polymer, measured in chloroform solution at 30° C., is 3.1 dl./g. The glass transition temperature, as measured by differential thermal analysis, is 142° C. Thermogravimetric analysis shows $T_1 = 280°$ C.; $T_{10} = 316°$ C., both in air and $T_1 = 280°$ C.; $T_{10} = 325°$ C., both in nitrogen.

Analysis for $C_4H_5FO$: Theory: C, 54.54; H, 5.72; F, 21.57; Found: C, 54.43; H, 5.81; F, 21.73.

The polymer remains colorless after 8 months of storage at room temperature.

Example 7

The procedure of Example 6 is repeated except that 7 parts of chloroform are used in place of the benzene. In this case a white solution of the polymer is obtained. The chloroform solution is treated as in Example 6 to give 0.7 part of white, glassy poly(1-fluorovinyl methyl ketone). The intrinsic viscosity of the polymer, measured in chloroform solution at 30° C., is 1.4 dl./g. The polymer is still white after 8 months of storage at room temperature.

Example 8

The procedure of Example 6 is again repeated except that no solvent is used. In this case, a glassy, solid, white polymer precipitate is formed in a 70% yield. Portions of the polymer are very faintly yellow and portions are colorless. The polymer is swelled by chloroform and maintains its color after storage at room temperature for 8 months.

Example 9

Into a suitable reaction vessel, equipped with a nitrogen inlet tube, stirrer, reflux condenser, and gas exit through a bubbler, are placed 20 parts of a standard aqueous buffer solution at pH 6.86 and 0.11 part of a polyethylene oxide emulsifying agent. The solution is stirred and purged with prepurified nitrogen for twenty minutes. 1-fluorovinyl methyl ketone, 2.1 parts, is added and a milky emulsion forms immediately. Ammonium persulfate, 0.035 part and triethanolamine, 0.022 part, are added as a polymerization catalyst and the nitrogen purge is continued for ten minutes. The mixture is stirred at 35° C., for 24 hours. The resultant white emulsion is poured into 200 parts of stirred methanol to precipitate the polymer, which is then separated by centrifugation. Drying under vacuum for eight hours at 50° C., gives 1.2 parts of polymer, as a fine, white powder which is slightly soluble in chloroform. The polymer powder remains white after 8 months of storage at room temperature.

Example 10

The procedure of Example 9 is repeated except that a buffer at pH 9.0 is used. 1.4 parts of a white, powdery polymer is produced which is insoluble in chloroform and remains white after 8 months of storage at room temperature.

Example 11

The procedure of Example 6 is again followed except that 0.7 part of methyl methacrylate is added along with the 1-fluorovinyl methyl ketone. After 20 hours of reaction, 1.5 parts of a hard, clear, water-white copolymeric material is recovered. The copolymer, upon analysis, is shown to contain both methacrylate and ketone linkages. Storage on a shelf for 8 months at room temperature does not cause the copolymer to change color.

Example 12

The procedure of Example 11 is followed except that 1.0 part of styrene is substituted for the methyl methacrylate. Again a hard, clear copolymer is recovered in a yield of 65%. The copolymer does not change color after storage at room temperature for about 8 months.

Example 13

Example 11 is repeated in all respects except that 2.0 parts of acrylonitrile is used as the comonomer in place of the methyl methacrylate. 2.1 parts of a pale yellow, clear copolymer is recovered. The yellowness of the copolymer is due to the acrylonitrile present therein. The color does not change after storage for 8 months at room temperature.

Example 14

The procedure of Example 9 is followed except that 1.0 part of acrylamide and 1.0 part of ethyl acrylate are added to the reaction vessel along with the 1-fluorovinyl methyl ketone. Upon completion of the reaction, 3.1 parts of copolymeric material, analyzed as containing amide, acrylate and ketone linkages, are recovered. The terpolymer remains essentially colorless after 8 months of storage at room temperature.

We claim:
1. A copolymer composed of from about 5% to about 75% of 1-fluorovinyl methyl ketone and, correspondingly, from about 95% to about 25%, of a different monoethylenically unsaturated monomer copolymerizable therewith.

2. A copolymer according to claim 1 wherein said monoethylenically unsautrated monomer is methyl methacrylate.

3. A process for the production of 1-fluorovinyl methyl ketone which comprises contacting 3-fluoro-4-hydroxy-2-butanone with a catalyst selected from the group consisting of phosphoric acid and boric anhydride in the presence of a polymerization inhibitor and at a temperature ranging from about 60° C. to about 250° C. and recovering 1-fluorovinyl methyl ketone by distillation of the resultant reaction media in the presence of ammonia gas.

References Cited

UNITED STATES PATENTS

| | | | |
|---|---|---|---|
| 2,173,066 | 9/1939 | Metzger et al. | 260—63 |
| 3,268,333 | 8/1966 | Allman et al. | 96—27 |
| 3,288,771 | 11/1966 | Mackenzie et al. | 260—88.7 |

WILLIAM H. SHORT, *Primary Examiner.*

L. LEE, *Assistant Examiner.*